United States Patent [19]

Yamashita et al.

[11] Patent Number: 5,074,166
[45] Date of Patent: Dec. 24, 1991

[54] CONTINUOUS SPEED VARIABLE TRANSMISSION CONTROL METHOD

[75] Inventors: Yoshinori Yamashita; Sadayuki Hirano, both of Shizuoka; Takumi Tatsumi; Hiroaki Yamamoto, both of Hyogo, all of Japan

[73] Assignees: Suzuki Jidosha Kogyo Kabushiki Kaisha, Shizuoka; Mitsubishi Denki Kabushiki Kaisha, Tokyo, both of Japan

[21] Appl. No.: 588,594

[22] Filed: Sep. 26, 1990

[30] Foreign Application Priority Data

Sep. 30, 1989 [JP] Japan ................... 1-256342

[51] Int. Cl.[5] ............................. B60K 41/22
[52] U.S. Cl. ............................. 74/866; 364/424.1
[58] Field of Search ............. 74/866; 364/424.1

[56] References Cited

U.S. PATENT DOCUMENTS

| | | | |
|---|---|---|---|
| 4,648,496 | 3/1987 | Petzold et al. | 192/0.096 X |
| 4,665,773 | 5/1987 | Hiramatsu et al. | 74/866 |
| 4,670,843 | 6/1987 | Matsumura et al. | 74/866 X |
| 4,718,308 | 1/1988 | Haley | 74/866 |
| 4,729,103 | 3/1988 | Oshiage et al. | 74/866 X |
| 4,856,380 | 8/1989 | Murano et al. | 74/866 |
| 4,958,538 | 9/1990 | Yamashita et al. | 74/866 |
| 4,962,678 | 10/1990 | Murano et al. | 74/844 |
| 4,964,317 | 10/1990 | Murano et al. | 74/844 |
| 4,982,822 | 1/1991 | Petzold et al. | 74/866 X |

FOREIGN PATENT DOCUMENTS 64-44349 2/1989 Japan .
2-150553 6/1990 Japan .

Primary Examiner—Leslie A. Braun
Assistant Examiner—Matthew Stavish
Attorney, Agent, or Firm—Flynn, Thiel, Boutell & Tanis

[57] ABSTRACT

A method for controlling a continuously variable transmission having a pair of pulleys each of which includes a groove defined between a stationary pulley element and a movable pulley element, including the step of using hydraulic oil for increasing and decreasing the width of the groove to respectively decrease and increase the radius of rotation of a belt looped around the pulleys to thereby vary the belt ratio. A hydraulic clutch is provided, and connection and disconnection of the clutch is controlled according to various predetermined control modes. Line pressure is controlled with a control device which uses both open loop control, and closed loop feedback control responsive to a signal from a pressure sensor. During open loop control, the line pressure is controlled so as to reflect the clutch pressure during a vehicle start mode.

5 Claims, 5 Drawing Sheets

CPSP ① ···· IN CASE COEFFICIENT OF FRICTION IS LOWERED DUE TO AGING CHANGE AND OIL TEMPERATURE INCREASE OF CLUTCH AND OIL

CPSP ② ···· REGULAR CLUTCH PRESSURE

CPSP ③ ···· IN CASE ENGINE OUTPUT IS LOWERED

CONTINUOUS SPEED VARIABLE TRANSMISSION CONTROL METHOD

FIELD OF THE INVENTION

This invention relates to a continuous speed variable transmission control method, and particularly to a continuous speed variable transmission control method in which proper line pressure control is performed during the vehicle start mode, and load on the internal combustion engine can be reduced.

BACKGROUND OF THE INVENTION

In vehicles, a transmission is interposed between an internal combustion engine and a driving wheel. This transmission is operated to change the driving force of the driving wheel and traveling speed in order to fit the traveling conditions of the vehicle, which are readily and extensively changed from time to time, so that the internal combustion engine can perform to full extent. As one type of such transmission, there is a continuous speed variable transmission which is designed such that a belt ratio is changed by transmitting power in such a manner as to increase or decrease the radius of rotation of a belt looped around pulleys, each pulley having a stationary pulley element fixed to a rotational shaft and a movable pulley element separably attached to the stationary pulley element. The rotational radius of the belt is changed by increasing or decreasing the width of a groove formed between the two pulley elements using hydraulic oil, for example. Such continuous speed variable transmission is disclosed in, for example, Japanese Patent Early Laid-open Publication No. Sho 64-44349.

A hydraulic control mechanism of the continuous speed variable transmission is provided with a single plate type hydraulic clutch adapted to feed and cut power from the engine in response to pressure exerted by hydraulic oil. This single plate type hydraulic clutch is controlled in various control modes in accordance with signals such as engine speed, opening degree of the throttle gate (valve) of a carburetor, etc.

The control modes of clutch pressure in this hydraulic clutch include, for example, the following patterns:

(1) NEUTRAL MODE

In this case the shift position is N or P and the hydraulic clutch plates have been completely disconnected, the clutch pressure is in the lowest level (zero) and the hydraulic clutch is off or disengaged.

(2) HOLD MODE

In this case the shift position is D or R and the throttle has been separated to indicate no intention to travel, or in case it is desired to reduce speed during traveling to cut off engine torque, the clutch pressure is at such a low level as the clutch plates are just connected and the clutch is in its half clutch state (creep state) under clutch pressure of 3.4 to 4.0 kg/cm$^2$.

(3) NORMAL START MODE

Engine torque is transmitted to the vehicle wheels under clutch pressure of 5 to 15 kg/cm$^2$.

(4) SPECIAL START MODE

Engine torque is transmitted to the vehicle wheels under clutch pressure of 5 to 15 kg/cm$^2$.

(5) DRIVE MODE

In this case the vehicle has shifted to a full traveling state and the clutch plates have been fully connected (clutch lock-up state), or after it has shifted from a start mode, the clutch is almost in a locked-up state, wherein the clutch pressure is at a sufficiently high level so as to be able to fully bear engine torque.

In the continuous speed variable transmission, a control unit is provided in order to control the activation of various valves of the hydraulic control mechanism and the hydraulic clutch.

This control unit inputs various control factors, actuates various devices and equipment, and controls the line pressure to a target value of line pressure by means of closed loop control for feeding back a hydraulic signal from a pressure sensor for detecting hydraulic oil pressure of the hydraulic control mechanism, and by means of open loop control in which feed-back by the pressure sensor is not performed.

That is, the closed loop control is carried out such that a target line pressure is established as a function of opening degree of the throttle gate value, belt ratio, engine speed, etc., a difference between such established target line pressure and an actual line pressure is integrated to calculate an integrated value, the target line pressure is corrected by such obtained integrated value, and feed-back control is performed so that the actual line pressure becomes the target line pressure. Also, open loop control is carried out such that feed-back control is not performed and the actual line pressure becomes the target line pressure.

Figure 5:
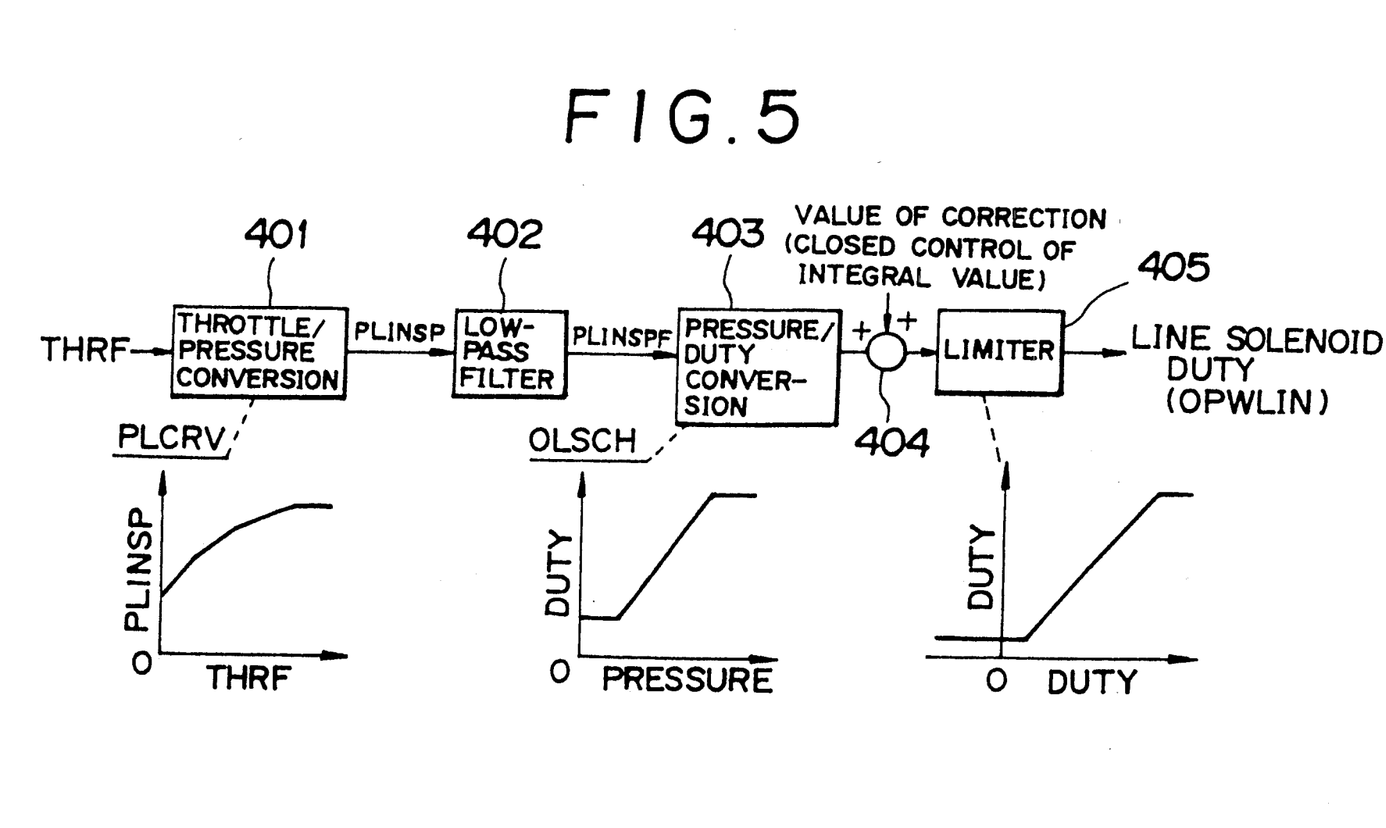
FIG. 5 is a block diagram of a conventional line pressure control loop.

For example, at a start mode time such as a normal start mode (NST) and a special start mode (SST) among control modes of clutch pressure, a filtered line pressure target value (PLINSPF) of line pressure control is established such that the belt and the hydraulic clutch do not slip even with the maximum torque which the internal combustion engine generates at the current opening degree (THR) of each throttle gate. Such established value is calculated with reference to a schedule or map (a throttle/pressure converting map, and a map between the line pressure target value (PLINSP) and the opening degree (THR) of the throttle gate) which is initially input into a program. That is, as is shown in FIG. 5, the filtered opening degree (THRF) of the throttle gate is input, and the line pressure target value (PLINSP) is calculated with a throttle/pressure converting map (401). A filtered line pressure target value (PLINSPF) is found by multiplying a low-pass filter (402), and a duty value or duty rate is found with a pressure/solenoid duty converting map (403). Then a value of correction as an integrated value of the closed control is added to this duty value (404), the corrected duty value is subjected to a limiter (which defines upper and lower limit values) (405), and finally a line pressure solenoid duty (OPWLIN) is output.

In one such control method, in order to absorb aging change and adjustment displacement of the hydraulic circuit, the amount of integration of the closed loop control is used as a value of correction for the open loop control (Japanese Patent Application No. Sho 63-302728).

Figure 6:
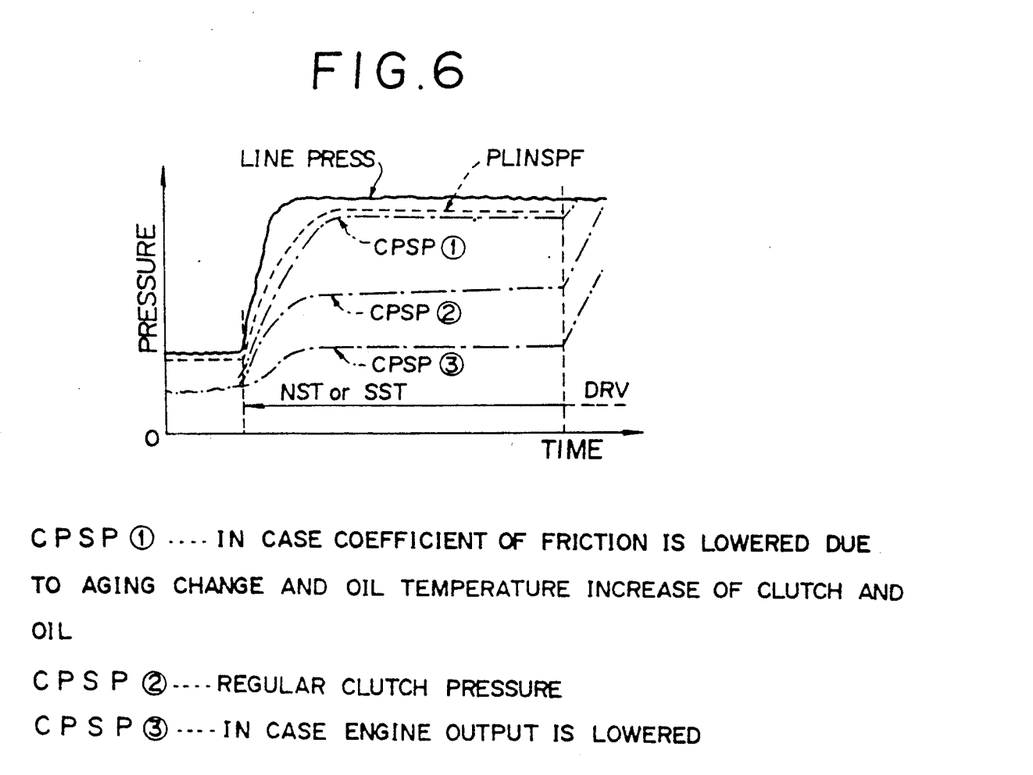
FIG. 6 is a characteristic chart showing hydraulic oil pressure over time using the conventional control method.

At start mode time, clutch pressure was heretofore controlled by deciding a target clutch pressure (CPSP) by means of feed forward control and speed loop control. At that time, when the clutch friction coefficient was lowered due to aging change of the hydraulic clutch and oil temperature increase, the target clutch pressure (CPSP), as shown in FIG. 6, was considerably higher (shown by CPSP 1 of FIG. 6) than a regular clutch pressure (shown by CPSP 2 of FIG. 6).

However, in the conventional line pressure control, since clutch pressure is not taken into consideration at start mode time, sufficiency of line pressure with respect to clutch pressure becomes less and, for that reason, there is an inconvenience in that a smooth clutch pressure control becomes impossible.

Also, since output of the internal combustion engine is lowered (i.e. the load increases) when such auxiliary devices as an air conditioner and power steering are used or when the vehicle is traveling on a high ground (elevation), the target pressure (CPSP) is considerably lower (shown by CPSP 3 of FIG. 6) than the regular clutch pressure (CPSP 2). In this way, even when the target clutch pressure (CPSP) is low, it is controlled to the ordinary line pressure target value and therefore, the clutch pressure is increased more than necessary, thus resulting in an increased load on the internal combustion engine.

Therefore the invention provides, in an attempt to obviate the above-mentioned inconveniences, a continuous speed variable transmission control method in which clutch pressure can be normally controlled against changes due to clutch aging change and oil temperature change, a proper line pressure control can be attained, and load on an internal combustion engine can be reduced by controlling the line pressure in such a manner as to reflect the clutch pressure control state of the hydraulic clutch when open loop control is being effected in the start mode.

In order to achieve the above, the present invention provides a continuous speed variable transmission which uses hydraulic oil for increasing or decreasing the width of a groove between a stationary pulley element and a movable pulley element separably attached to said stationary pulley element to respectively decrease or increase the radius of rotation of a belt looped around said two pulleys, thereby to vary the belt ratio. A continuous speed variable transmission control method is characterized in that a hydraulic clutch is provided, connection and disconnection of said clutch being controlled by various kinds of control modes, and a control portion is also provided, said control portion controlling line pressure both by means of closed loop control for performing feedback in accordance with a hydraulic signal from a pressure sensor and open loop control which does not perform the feed back, the line pressure being controlled by said control portion in such a manner as to reflect the clutch pressure controlling state of said hydraulic clutch when said open loop control is performed in the start mode.

According to this method of the present invention, since line pressure is controlled in such a manner as to reflect the clutch pressure control state of the hydraulic clutch when open loop control is performed in the start mode, line pressure is controlled in such a manner as to reflect the clutch pressure control state even when the clutch friction coefficient is lowered due to clutch aging change and oil temperature change, and a smooth line pressure control is ensured. In addition, the load on the internal combustion engine can be reduced by preventing the line pressure from becoming higher than necessary even when the output of the internal combustion engine is lowered.

BRIEF DESCRIPTION OF THE DRAWINGS

The embodiment of the present invention will be described in detail and concretely with reference to the drawings, in which.

DETAILED DESCRIPTION

Figure 2:
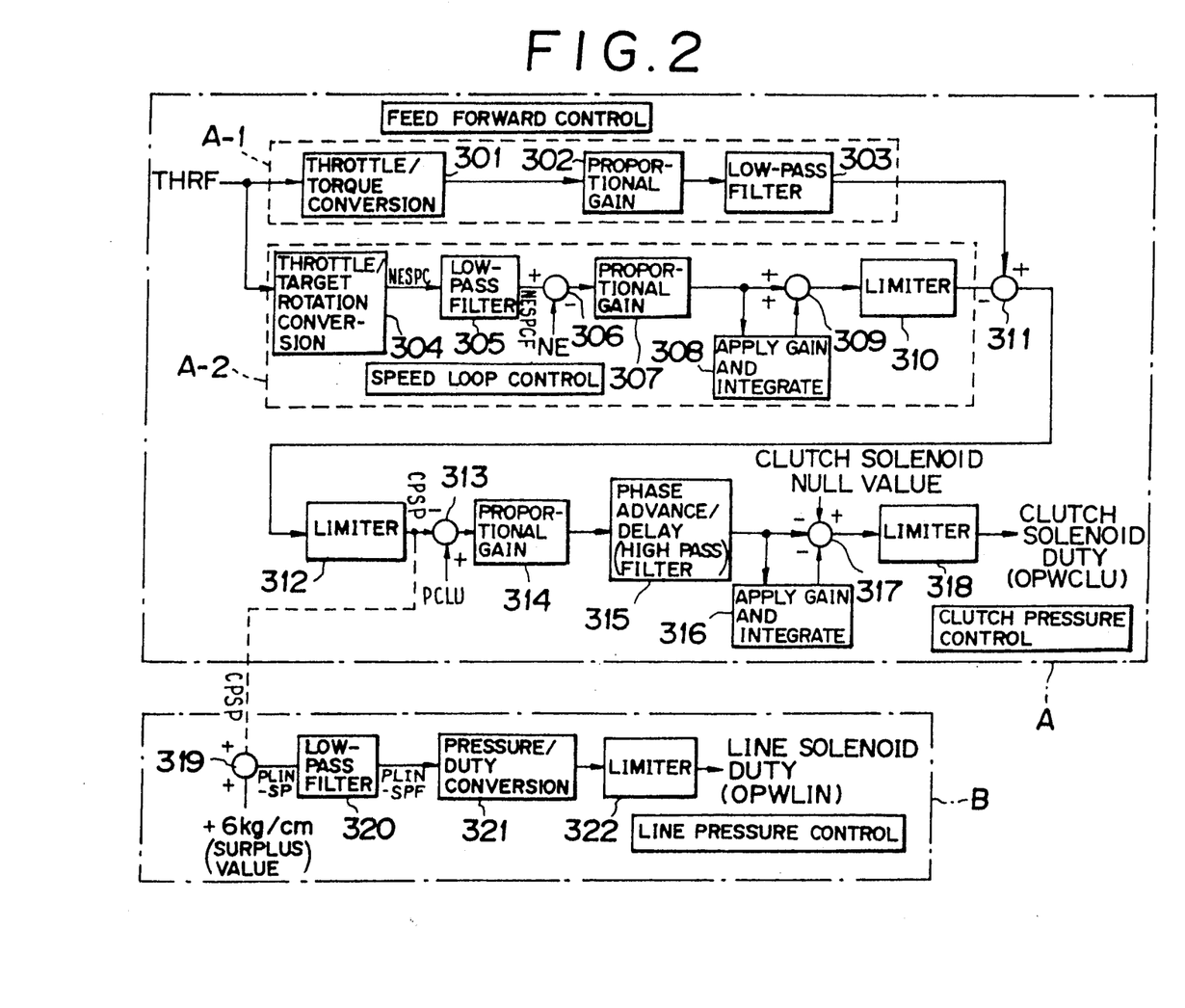
FIG. 2 is a conceptual block diagram of the clutch pressure and line pressure control loops of the present invention.
Figure 3:
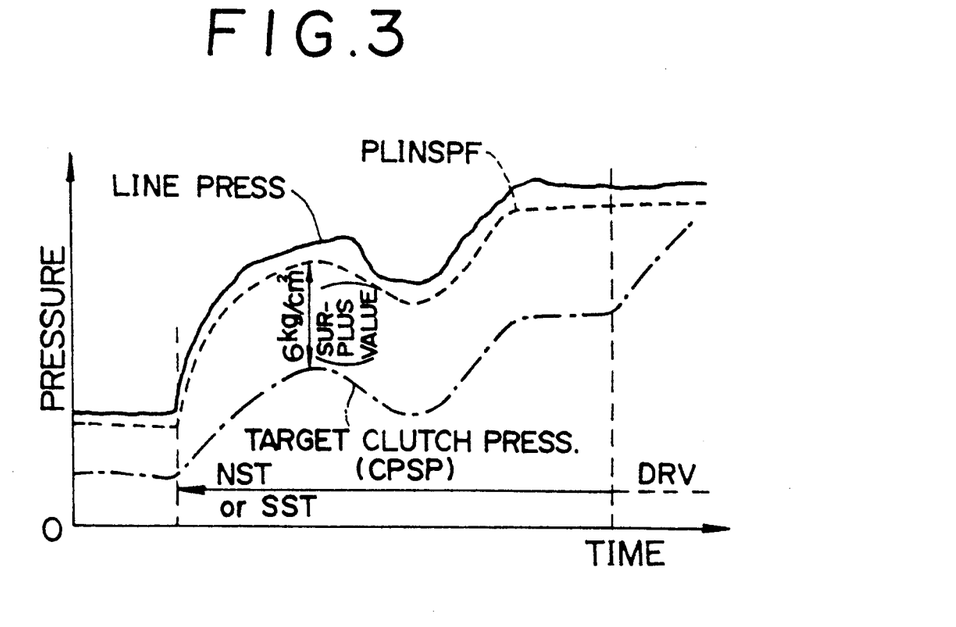
FIG. 3 is a characteristic chart which shows hydraulic oil pressure over time using the control method of FIGS. 1 and 2.
Figure 4:
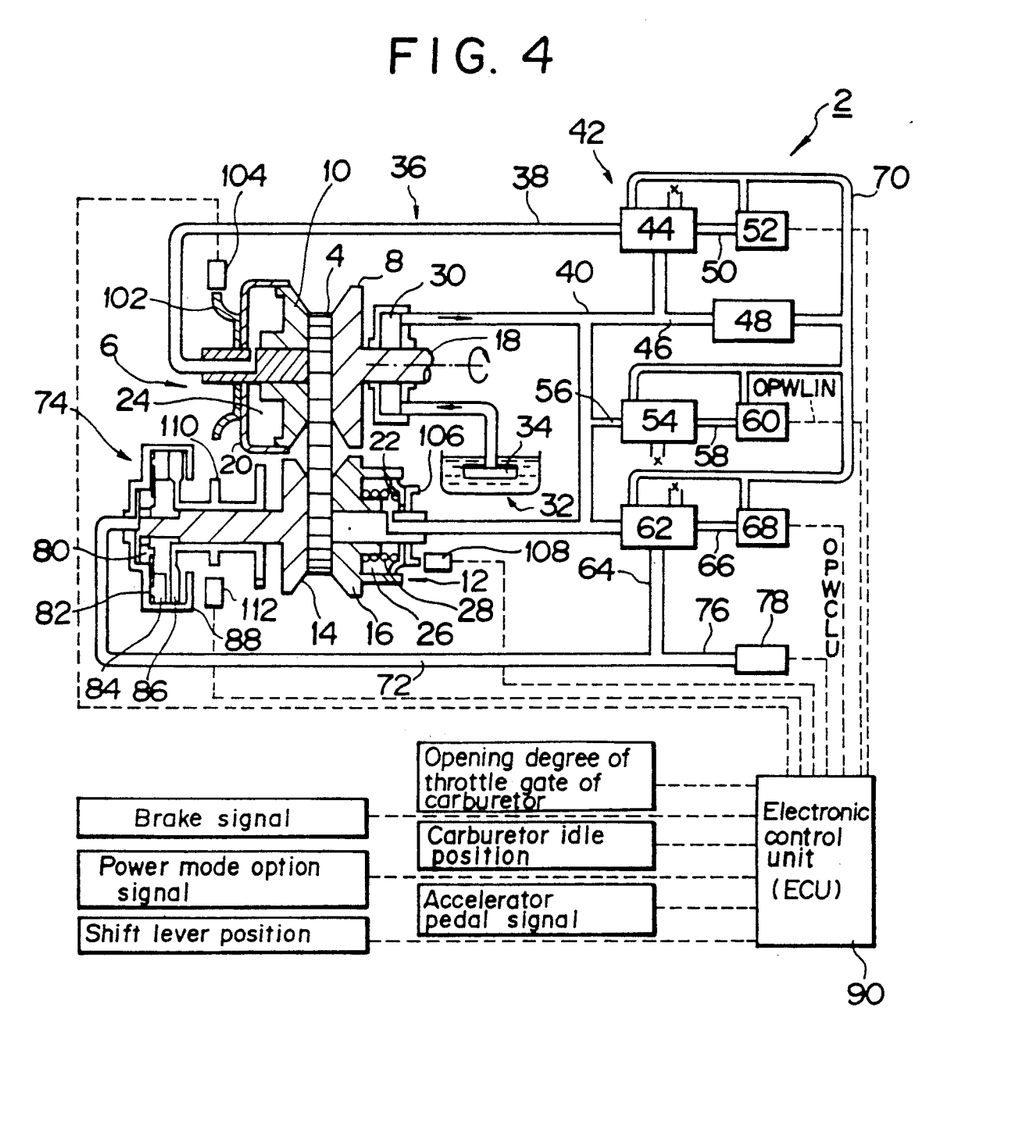
FIG. 4 is a schematic view of a hydraulic control mechanism of a continuous speed variable transmission according to present invention.

FIGS. 1 through 4 show an embodiment of the present invention. In FIG. 4, the numeral 2 denotes a continuous speed variable transmission, 4 a belt, 6 a drive side pulley having a drive side stationary pulley element 8 and a drive side movable pulley element 10, and 12 a driven side pulley having a driven side stationary pulley element 14 and a driven side movable pulley element 16. The drive side pulley 6 has the driven side stationary pulley element 10 fixed to a rotational shaft 18 which is rotated by a prime mover (i.e., an engine), and the drive side movable pulley element 10 mounted on the rotational shaft 18 so as to move in the axial direction but unable to rotate relative thereto.

The drive side movable pulley element 10 and the driven side movable pulley element 12 have first and second housings 20, 22 mounted thereon respectively. By this, first and second hydraulic pressure chambers 24 and 26 are formed, respectively. Disposed within the driven side second hydraulic pressure chamber 26 is a spring 28 for urging the driven side movable pulley element 16 toward the driven side stationary pulley element 14.

One end portion of the rotational shaft 18 is provided with an oil pump 30. This oil pump 30 is operated to feed oil from an oil pan 32 through an oil filter 34 and into the first and second hydraulic pressure chambers 24 and 26 through first and second oil passages 38 and 40 constituting a hydraulic circuit 36. Disposed at an intermediate part of the first oil passage 38 is a primary pressure control valve 44 as a change speed control valve constituting a pressure control means 42 for controlling primary pressure as an input shaft sheave pressure. Similarly, a third oil passage 46 communicating with the second oil passage 40 on the side of the oil pump 30 rather than the primary pressure control valve 44 is provided with a constant pressure control valve 48 adapted to control line pressure (in general, 5 to 25 kg/cm$^2$) to a constant pressure (for example, 3 to 4 kg/cm$^2$). Furthermore, the primary pressure control valve 44 is provided with a primary pressure control first three-way electromagnetic valve 52 connected thereto through a fourth oil passage 50.

Also, a line pressure control valve 54 having an escape valve function for controlling line pressure as a pump pressure is connected to the third oil passage 40 through a fifth oil passage 56. The line pressure control valve 54 is connected to a second three-way electromagnetic valve 60 for controlling line pressure through a sixth oil passage 58.

Furthermore, a clutch pressure control valve 62 communicates with an intermediate part of the second oil passage 40 on the side of the second hydraulic pressure chamber 26 rather than the portion communicating with the line pressure control valve 54. This clutch pressure control valve 62 is connected to a seventh oil passage 64 discussed below, and is also connected with a three-way electromagnetic valve 68 for controlling clutch pressure through an eighth oil passage 66.

The primary pressure control valve 44, the primary pressure controlling first electromagnetic valve 52, the constant pressure control valve 48, the line pressure control valve 54, the line pressure controlling second three-way electromagnetic valve 60, the clutch pressure control valve 62, and the clutch pressure controlling third three-way electromagnetic valve 68 are communicated with each other through a ninth oil passage 70.

The clutch pressure control valve 62 is communicated with a hydraulic pressure clutch 74 through a tenth oil passage 72 communicating with the seventh oil passage 64. A pressure converter (pressure sensor) 78 is communicated with an intermediate part of this tenth oil passage 72 through an eleventh oil passage 76. This pressure converter 78 can directly detect hydraulic oil pressure in the clutch such as during the hold and start modes, and has the function of issuing a command to make such clutch hydraulic oil pressure a target clutch pressure. Also, it contributes to line pressure control since the clutch pressure and the line pressure become generally equal to each other when in a drive mode.

The hydraulic clutch 74 is conventional and comprises a piston 80, an annular spring 82, a first pressure plate 84, a friction plate 86, and a second pressure plate 88.

Also, there is provided control means (ECU) 90 for controlling the change speed by changing duty ratio by inputting various conditions such as opening degree of a throttle gate valve and engine speed, so that the primary pressure controlling first three-way electromagnetic valve 52, the line pressure controlling second three-way electromagnetic valve 60, and the clutch pressure controlling three-way electromagnetic valve 68 are opened and closed by this control unit 90 and, in addition, the pressure converter 78 is also controlled by the control unit 90.

As will be evident from the following description, the control unit 90 may be embodied as a conventional microprocessor circuit.

Various signals are input into the control unit 90 and the functions of such input signals will be described in detail.

(1) DETECTION SIGNAL OF SHIFT LEVER POSITION

To control line pressure, belt ratio and clutch pressure as required for each range in accordance with each range signal such as P, R, N, D, and L.

(2) DETECTION SIGNAL OF OPENING DEGREE OF THROTTLE GATE OF CARBURETOR

This signal is used to decide a target belt ratio or a target engine speed. Based on this signal, engine torque is determined from a memory in the control unit.

(3) DETECTION SIGNAL OF CARBURETOR IDLE POSITION

To improve accuracy in correction and control of a sensor of opening degree of a throttle gate of a carburetor.

(4) ACCELERATOR PEDAL SIGNAL

To decide a controlling method for the traveling time or for the starting time by detecting the driver's will based on how deeply the accelerator pedal is depressed.

(5) BRAKE SIGNAL

To decide a controlling method as for disconnection of clutch plates, etc. by detecting whether the brake pedal is stepped on.

(6) POWER MODE OPTION SIGNAL

To use as an option for converting the vehicle performance to a sport (high performance) type or to an economic type.

An input shaft rotation detection gear 102 is disposed on the outside of the first housing 20, and an input shaft side first rotation detector or sensor 104 is disposed in the vicinity of an external peripheral portion of this detection gear 102. Similarly, an output shaft rotation detection gear 106 is disposed on the outside of the second housing 22, and an output shaft side second rotation detector or sensor 108 is disposed in the vicinity of the external peripheral portion of this detection gear 106. Detection signals of the first rotation detector 104 and the second rotation detector 108 are output to the control means 90 so as to be used for determining the engine speed and belt ratio.

The hydraulic clutch 74 is provided with an output transmission gear 110, and a third rotation detector 112 for detecting rotation of a final output shaft is disposed in the vicinity of the external peripheral portion of this output transmission gear 110. That is, this third rotation detector 112 is adapted to detect rotation of the final output shaft, which is directly connected to a reduction gear and a differential gear, the drive shaft and the tires, and which thereby makes it possible to detect vehicle speed. Rotation of the input and output shafts of the hydraulic clutch 74 can be detected by the second and third rotation detectors 108 and 112, thus enabling the slip amount of the clutch to be detected.

The control unit 90 is operated to control line pressure to a line pressure target value (PLINSP) by means of closed loop control in which feed back is performed in accordance with a hydraulic signal from the pressure converter 78 and by means of open loop control in which feed back is not performed by the pressure converter 78. It is also operated to control the line pressure in such a manner as to reflect the clutch pressure of the hydraulic clutch 74, that is, to reflect the target clutch pressure (CPSP) and the clutch pressure (PCLU) when the open loop control is performed in the normal start mode (NST) or the special start mode (SST).

The closed loop control is performed such that a target line pressure is established from a map of the opening degree of the throttle gate, the belt ratio, engine speed or the like, and difference between such established target line pressure and an actual line pressure is integrated to obtain an integrated value, and the target line pressure is corrected by such obtained integrated value, thereby to perform feed back control so that the line pressure becomes the corrected target line pressure.

The open loop control is performed such that the line pressure becomes the target line pressure without performing feed back.

As control modes of such clutch pressure controlling modes, there are the patterns described below.

(1) NEUTRAL MODE

In this case the shift position is N or P, and the hydraulic clutch 74 is completely disengaged. The clutch pressure is the lowest pressure (zero) and the hydraulic clutch 74 is in its OFF position.

(2) HOLD MODE (HOL)

In this case the throttle is at idle indicating the driver's intention not to travel when the shift position is D or R (e.g. at a traffic light), or the driver wants to cut off engine torque by reducing speed during traveling, the clutch pressure is at low level such that the hydraulic clutch 74 contacts, and the clutch is in its half clutch state (creep state) under clutch pressure of 3.5 to 4.0 kg/cm$^2$.

(3) NORMAL START MODE (NST)

Engine torque is transmitted to the vehicle wheels under clutch pressure of 5 to 15 kg/cm$^2$.

(4) SPECIAL START MODE (SST)

Engine torque is transmitted to the vehicle wheels under clutch pressure of 5 to 15 kg/cm$^2$.

(5) DRIVE MODE (DRV)

In this case the vehicle has shifted to a full traveling state and the hydraulic clutch 74 has been fully connected (clutch lock-up state), or after it has shifted from a start mode the clutch is almost in a locked-up state, wherein the clutch pressure is sufficiently high to fully bear engine torque.

In the preferred embodiment of the invention, the control unit 90, when open loop control is performed in the start mode, calculates a line pressure target value (PLINSP) by adding a constant surplus value (for example, 6 kg/cm$^2$) to the target clutch pressure (CPSP), or calculates the line pressure target value (PLINSP) by adding the surplus value to a clutch pressure value (PCLU) as read by the control unit 90 and performs line pressure controlling using this line pressure target value (PLINSP).

Next, the operation of this embodiment will be described.

The continuous speed variable transmission 2, as shown in FIG. 4, is designed such that the oil pump 30 located on the rotational shaft 18 is activated in accordance with rotation of the rotational shaft 18, and oil from the oil pan 32 is pumped through the oil filter 34. Line pressure (in passage 40) as a pump pressure is controlled by the line pressure control valve 54, and if a large quantity of oil is permitted to escape from this line pressure control valve 54 (i.e. back to the reservoir or pan 32), the line pressure becomes low. On the contrary, if the escape quantity of oil through valve 54 is small, the line pressure becomes high.

Action of the line pressure control valve 54 is controlled by the exclusive-use second three-way electromagnetic valve 60, and the line pressure control valve 54 is activated following the action of this second three-way electromagnetic valve 60. This second three-way electromagnetic valve 60 is controlled at a duty ratio of a constant frequency. That is, duty ratio 0 refers to a state where the second three-way electromagnetic valve 60 is not activated at all, in which the output side is communicated with the atmospheric side and the output hydraulic oil pressure becomes zero. Also, 100% duty ratio refers to a state where the second three-way electromagnetic valve 60 is activated and the output side is communicated with the input side to become the same maximum output hydraulic pressure as the control pressure. That is, output hydraulic pressure is changed due to change in duty ratio to the second threeway electromagnetic valve 60. Therefore, the second three-way electromagnetic valve 60 is capable of activating the line pressure control valve 54 analogwise, and the line pressure can be controlled by desirably changing the duty ratio of the second three-way electromagnetic valve 60. Also, the action of this second three-way electromagnetic valve 60 is controlled by the control unit 90.

The change speed controlling primary pressure in passage 38 is controlled by the primary pressure control valve 44, and this primary pressure control valve 44 is controlled by the exclusive-use first three-way electromagnetic valve 52. This first three-way electromagnetic valve 52 is used in order to communicate the primary pressure with either the line pressure or the atmospheric side so as to shift the belt ratio to the full overdrive side when the primary pressure is communicated with the line pressure or to the full low side when the primary pressure is communicated with the atmospheric side.

The clutch pressure control valve 62 for controlling the clutch pressure is adapted to communicate the clutch pressure with the line pressure side when the maximum clutch pressure is necessary and communicate the clutch pressure with the atmospheric side when the lowest clutch pressure is required. This clutch pressure control valve 62 is controlled by the exclusive-use third three-way electromagnetic valve 68 in similar fashion to the control of valves 44 and 54 by valves 52 and 60. The clutch pressure is thus changed in a range from atmospheric pressure (zero) to the maximum line pressure. This clutch pressure controlling is altered by the above-mentioned patterns.

The primary pressure control valve 44, the line pressure control valve 54, and the clutch pressure control valve 62 are controlled by output hydraulic oil coming from the first, second and third three-way electromagnetic valves 52, 60 and 68, respectively. The control hydraulic oil for controlling these first, second and third three-way electromagnetic valves 52, 60 and 68 is at a constant hydraulic oil pressure regulated by the constant pressure control valve 48. This control hydraulic oil is at a stable constant pressure which is always lower than the line pressure in passage 40. The control hydraulic oil in pasage 70 is also introduced into the respective control valves 44, 54 and 62 in order to stabilize them.

The continuous speed variable transmission 2 is hydraulic controlled, wherein a line pressure (passage 40) proper to hold the belt and transmit the torque, a primary pressure (passage 38) for changing the belt ratio, and a clutch pressure (passage 72) for reliably engaging the hydraulic clutch 74 are provided.

Next, the clutch pressure control and the line pressure control by the control unit 90 will be described with reference to FIG. 2. In the open loop control of the control unit 90, the clutch pressure control A and the line pressure control B will be described.

In the clutch pressure control A, a target clutch pressure CPSP is decided by a feed forward control A-1 and a speed loop control A-2.

The feed forward control A-1 is carried out such that the opening degree THRF of the throttle gate value after filter is converted by a throttle/torque conversion map or function 301, and a value obtained from this throttle/torque conversion map 301 is multiplied by a proportional gain 302, and the value obtained by multiplying by this proportional gain 302 is then multiplied by a low-pass filter 303 to find a value of clutch pressure which matches with the engine torque.

In the speed loop control A-2, the throttle opening degree THRF is converted by a throttle/target rotation conversion map or function 304 to find a clutch control target number of rotations NESPC, and this clutch control target number of rotations NESPC is multiplied by a low-pass filter 305 to find a filtered clutch control target number of rotations NESPCF. Then the target clutch pressure CPSP is regulated 306 so that the actual engine speed NE will become this filtered clutch control target number of rotations NESPCF. That is, the difference between NESPCF and NE is determined, and the resulting value is multiplied by a proportional gain 307. At 308, the value obtained from 307 is first multiplied by an integral gain and then integrated. The value obtained from 307, and the value obtained from 308 are then added at 309, and the sum is then multiplied by a limiter 310. Thus, 307, 308 and 309 represent a series type proportional-plus-integral (PI) control section, which is known in the art.

The value of the clutch pressure matching with the engine torque output, as produced by the feed forward control A-1, and the value of clutch pressure obtained by taking into consideration the actual engine speed, as produced by speed loop control A-2, are then compared at 311. The value (i.e. difference between the A-1 and A-2 output values) obtained is multiplied by a limiter 312 and a target clutch pressure CPSP is established.

This target clutch pressure CPSP is compared at 313 with an actual clutch pressure value PCLU detected by the pressure converter 78, and then the resulting value is multiplied by a proportional gain 314. The value obtained by multiplying the proportional gain 314 is then multiplied by a phase advance/delay processor 315 (high pass filter). In order to obtain the function of a high-pass filter in the transfer function of 315, the components are classified as a phase delay (low-pass filter) component and other components, and only these latter other components are transferred. At 316, the value obtained from 315 is first multiplied by an integral gain and then integrated. The values obtained from 315 and 316 are subtracted from a clutch solenoid null value as indicated at 317, to obtain a duty value which is multiplied by a limiter 318 to output a clutch solenoid duty (i.e. signal) OPWCLU. It will be recognized that conventional proportional-plus-integral (PI) control is performed at 314, 315, 316 and 317. The clutch solenoid null value represents an intermediate duty value, for example, 60%.

Figure 1:
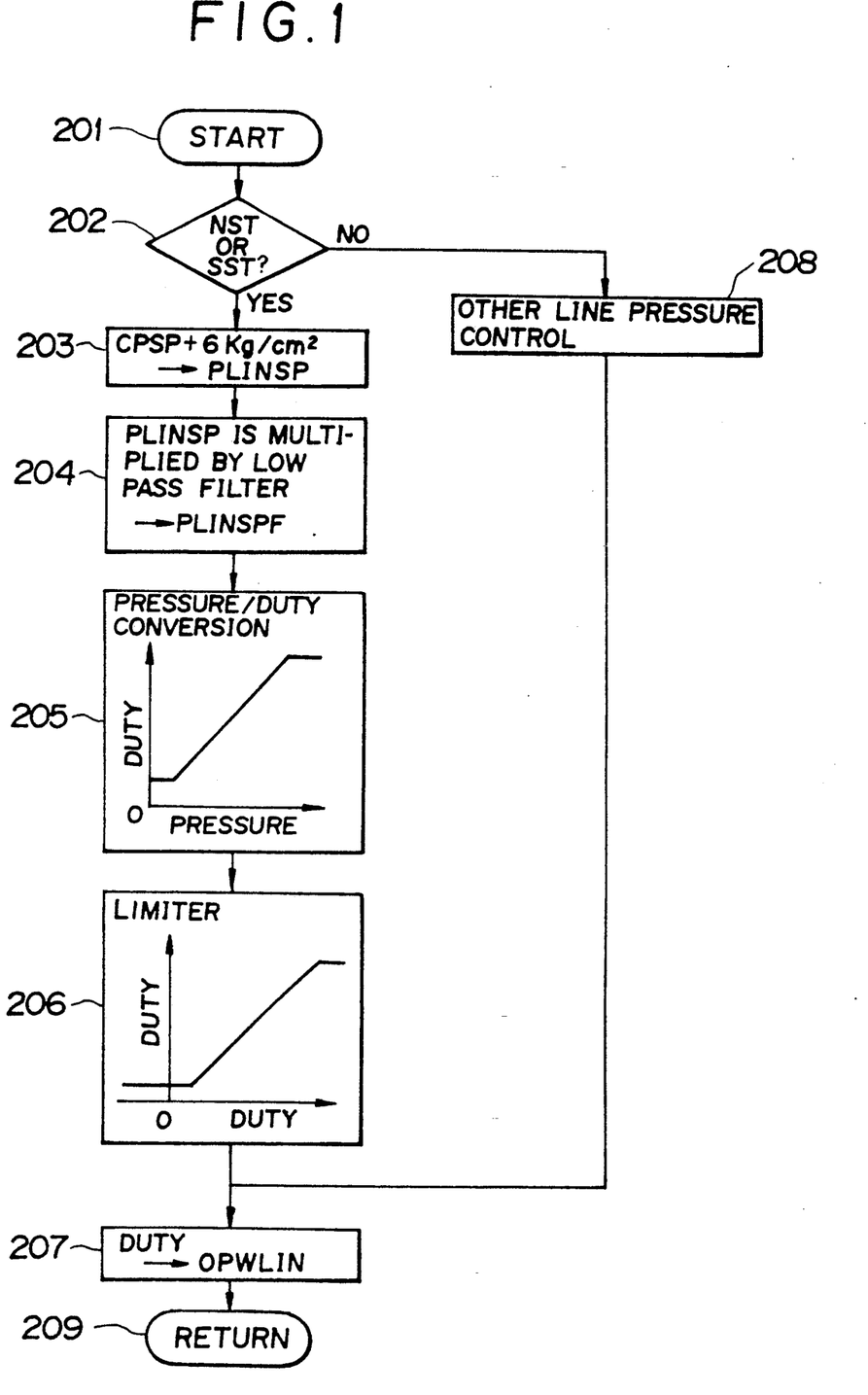
FIG. 1 is a flowchart for explaining the control of line pressure in the start mode according to the present invention.

Line pressure control is performed in accordance with the flowchart of FIG. 1 when open loop control is to be performed in a start mode.

Upon start (201) of the program, first, a judgement is made as to whether the control mode is a normal start mode (NST) or a special start mode (SST).

If the judgement for the start mode in Step 202 is YES, a surplus value (for example, 6 kg/cm$^2$) is added (as indicated at 319 in FIG. 2) to the target clutch pressure CPSP, as calculated by the clutch pressure control A, to decide a line pressure target value PLINSP (Step 203).

This line pressure target value PLINSP is multiplied by a low-pass filter (indicated at 320 in FIG. 2) to decide (Step 204) a filtered line pressure target value PLINSPF. This filtered line pressure target value PLINSPF is input into a pressure/solenoid duty conversion map (indicated at 321 in FIG. 2) to decide a duty value (Step 205).

Then, this duty value is multiplied (Step 206) by the limiter (indicated at 322 in FIG. 2).

Then, this duty value from the limiter is output (Step 207) as a line pressure solenoid duty value (i.e. signal) OPWLIN.

If the judgement in Step 202 is NO (other modes), other line pressure control is performed (Step 208) and a line pressure solenoid duty value OPWLIN is output in Step 207.

Thereafter, the control loop ends (Step 209).

Calculation of the line pressure solenoid duty value OPWLIN may be performed, for instance, once every 10 msec.

That is, when the driver operates the accelerator pedal to start the vehicle, the control mode is shifted from a hold mode (HLD) to the drive mode (DRV) via the normal start mode (NST). At that time, the clutch control is performed such that the pressure is controlled to a creep pressure in the hold mode (HLD), and in order to hold the hydraulic clutch in an engaged state in the drive mode (DRV), the clutch solenoid duty OPWCLU applied to the electromagnetic value 68 in FIG. 4 is set to 100%, and the valve 62 operates such that the clutch pressure (in passage 72) is made equal to the line pressure (in passage 40). On the other hand, in the normal start mode (NST), a clutch pressure matching with the engine torque is calculated by the feed forward control A-1 and at the same time, the target clutch pressure CPSP is controlled by the speed loop control A-2 such that the engine speed NE becomes a target engine speed NESPCF corresponding to the opening degree THR of the throttle gate. Owing to the foregoing, the target clutch pressure CPSP is influenced by the internal combustion engine, the hydraulic clutch and the state of oil. The clutch pressure is controlled by feed back control for regulating the clutch solenoid duty OPWCLU so that the clutch pressure value PCLU as a detection value of the pressure converter 78 becomes coincident with the target clutch pressure CPSP.

In such a control system, in this embodiment, the line pressure control in the start mode is carried out as shown in FIG. 3, wherein pressure of a surplus value (for example, 6 kg/cm$^2$) is added to the target clutch pressure CPSP to arrive at a line pressure target value PLINSP. The line pressure solenoid duty value OPWLIN is decided with reference to the low-pass filtered line pressure target value PLINSPF to perform the open loop control and thereby control the line pressure. This is because in case the target clutch pressure CPSP is used, a phenomenon can be taken in advance compared with a case where clutch pressure obtainable as a result is used.

If the line pressure target value PLINSP is decided by adding a surplus value (for example, 6 kg/cm$^2$) to the actual clutch pressure value PCLU, that is, in case PLINSP=PCLU+6 kg/cm$^2$, even in a case where feed back control of the clutch pressure is not performed favorably and the clutch pressure PCLU is not coincident with the target clutch pressure CPSP, a line pressure which is actually required can be secured and is thus effective.

As a result, the line pressure can be raised sufficiently high to achieve a normal clutch control against clutch aging change and oil temperature change. Moreover, a proper line pressure control can be attained.

Also, the line pressure can be lowered when such auxiliary devices as the air conditioner and power steering are used or when the vehicle is traveling on high ground, thus enabling to reduce the load on the internal combustion engine.

Furthermore, the line pressure control in the start mode can be performed by simply modifying the control unit 90 (such as by changing the program in a microprocessor) and without necessitating any alteration of the hydraulic control mechanism. In this way, implementation of the control according to the invention is simplified and actual practice is easy.

Accordingly, even if the coefficient of friction is lowered due to clutch aging change and oil temperature change, line pressure is controlled to reflect the clutch pressure control state even when the friction coefficient is lowered, and a smooth line pressure control is ensured by preventing less sufficiency of the line pressure. In addition, load on the internal combustion engine can be reduced by preventing the line pressure from becoming higher than necessary, even when the output of the internal combustion engine is lowered Moreover, the line pressure control can be achieved only by changing the program in the control unit and therefore, the line pressure can be controlled easily in the start mode. In addition, the hydraulic control mechanism is not required to be modified and actual practice becomes easy.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for controlling a continuous speed variable transmission having a pair of pulleys, including the steps of providing hydraulic oil at a line pressure for use in the transmission, using the hydraulic oil for increasing and decreasing the width of a groove defined in each said pulley between an axially stationary pulley element and an axially movable pulley element to respectively decrease and increase the radius of rotation of a belt looped around said pair of pulleys thereby to vary the belt ratio, the improvement comprising the steps of providing a hydraulic clutch, deriving clutch pressure from said hydraulic oil by causing the pressure associated with said hydraulic oil to change from said line pressure to said clutch pressure, applying said clutch pressure to said clutch for controlling connection and disconnection of said clutch according to various predetermined control modes, providing a control portion, controlling said line pressure with said control portion both by means of closed loop control which performs feedback in accordance with a hydraulic signal from a pressure sensor and open loop control which does not perform the feedback, and controlling said line pressure with said control portion during said open loop control in such a manner as to reflect a clutch pressure requirement of said hydraulic clutch when said clutch is in a vehicle start mode among said control modes.

2. In a method for controlling a continuously variable transmission apparatus for vehicles, said transmission apparatus including a pair of rotatable pulleys, each said pulley having a circumferential groove therein defined between relatively axially movable pulley members, a belt wrapped around said pulleys and received in said grooves, a hydraulic clutch for coupling said transmission apparatus to a vehicle drive train, and oil supply means for providing hydraulic oil at a line pressure, including the step of increasing and decreasing the width of said grooves to respectively decrease and increase the rotational radius of said belt to thereby adjust the belt ratio of said transmission apparatus, the improvement comprising the steps of:

deriving clutch pressure from the hydraulic oil provided by said oil supply means, including the steps of causing the pressure associated with said hydraulic oil to change from said line pressure to said clutch pressure;

applying said clutch pressure to said clutch;

determining a target clutch pressure value based on the throttle position and engine speed of the vehicle;

adjusting said clutch pressure to equal the target clutch pressure value; and adjusting said line pressure based on said target clutch pressure value if said clutch is in a start mode thereof.

3. The method according to claim 2, wherein said step of determining said target clutch pressure value includes the steps of determining an intermediate clutch pressure value which is based on the throttle position and which matches the torque of the vehicle engine, using a throttle-to-rotational speed conversion function to determine a clutch control rotational speed value based on the throttle position, establishing a difference value which represents the difference between said clutch control rotational speed value and the actual speed of the vehicle engine, and determining said target clutch pressure value based on said intermediate clutch pressure value and said difference value.

4. The method according to claim 2, wherein said line pressure adjusting step includes the steps of determining a target line pressure value by adding a predetermined value to said target clutch pressure value, and generating a line pressure control signal based on said target line pressure value.

5. The method according to claim 2, wherein said clutch pressure adjusting step includes the steps of using a pressure sensor to detect an actual value of said clutch pressure, and comparing said actual clutch pressure value to said target clutch pressure value.

* * * * *